Patented Sept. 15, 1953

2,652,405

UNITED STATES PATENT OFFICE 2,652,405

ALKYLATION OF THIANAPHTHENE

Robert E. Conary and Rush F. McCleary, Beacon, N. Y., assignors to The Texas Company, New York, N. Y., a corporation of Delaware No Drawing. Application June 5, 1948, Serial No. 31,387

7 Claims. (Cl. 260—330.5)

This invention relates to a process for the production of aliphatic-substituted thianaphthene derivatives and more particularly to a method of alkylating thianaphthene and thianaphthene homologs.

The preparation of alkyl-substituted thianaphthene derivatives has previously been primarily of academic interest and the methods employed in the preparation of such compounds, as exemplified by the Wurtz-Fittig reaction, have been adapted solely to small batch-type operation.

We have discovered that aliphatic-substituted thianaphthene derivatives can be prepared by reacting a compound containing a thianaphthene nucleus and having at least one reactive hydrogen atom on the 2 or 3 carbon atoms with an alkylating agent containing three or more carbon atoms in the presence of a catalyst comprising sulfuric acid in which the weight per cent concentration of sulfuric acid is less than about 88 per cent. Alkyl-substituted thianaphthene derivatives are obtained by the direct alkylation of a thianaphthene compound containing at least one hydrogen atom attached to the 2 or 3 positions of thianaphthene. Alkylation is effected in either one or both of the reactive 2 and 3 positions of thianaphthene, depending upon the mol ratios of alkylating agent to thianaphthene derivatives and the conditions of reaction.

The thianaphthene compounds which can be alkylated in accordance with the process of this invention comprise thianaphthene itself, thianaphthene homologs and substituted thianaphthene compounds in which at least the 2 or 3 carbon atoms of the thianaphthene nucleus has a reactive hydrogen atom attached thereto. Thianaphthene itself (also called benzothiophene) is a fused cyclic thiophene derivative in which a benzene nucleus and a thiophene nucleus share two carbon atoms. It has the following schematic structural formula:

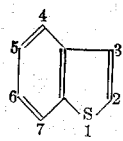

As will be observed from the above structural formula, the sulfur atom of thianaphthene is designated as the 1-position in the ring and the carbons are numbered counterclock-wise therefrom; consequently, the 2 and 3 positions are the hydrogen-containing carbon atoms of the thiophene nucleus in thianaphthene.

As was previously mentioned, thianaphthene homologs such as 2-methylthianaphthene, 4-methylthianaphthene, etc. may be alkylated in accordance with the method of this invention. Substituted thianaphthenes such as 2-chlorothianaphthene, 5-nitrothianaphthene, 3-bromothianaphthene may also be alkylated in accordance with the process of this invention. Thianaphthene homologs or substituted thianaphthene compounds which are employable in the process of this invention must contain at least one reactive hydrogen atom attached to the 2 or 3 position in thianaphthene.

When referring to the reactive hydrogen atoms in the 2 and 3 positions of thianaphthene in the description and claims of the invention, it is to be understood that reference is made to those hydrogen atoms in the 2 or 3 position of thianaphthene which are capable of substitution by an alkyl or aliphatic radical. This distinction is necessary only in the case of substituted thianaphthene compounds and particularly such thianaphthene compounds as are substituted by strongly negative radicals such as a nitro group, a carboxylic acid group, etc.

As previously indicated, the process of the invention is applicable to the alkylation of thianaphthene compounds with an alkylating agent containing at least 3 carbon atoms. The type of alkylating agents which may be used is analogous in composition to the alkylating agents used in conventional sulfuric acid alkylation reactions and includes olefins, diolefins, alcohols, esters, alkylhalides etc. In the preferred embodiment of the invention, preference is given to the use of olefins as the alkylating agent. These olefins may be any of the normally gaseous or normally liquid olefins or mixtures thereof containing at least three carbon atoms in the molecule as, for example, propylene, butylenes, amylenes, $C_4$ polymers such as di-isobutylene and tri-isobutylene, cross polymers of isobutylene and normal butylene, mixed or non-selective $C_3-C_4$ polymers and various fractions of thermally or catalytically cracked gasolines or polymer naphthas, etc. Applicable also are the diolefins, such as butadiene, and various alcohols such as isopropyl alcohol, tertiary butyl alcohol, secondary butyl alcohol, cyclohexanol, as well as the alkyl esters, such as the alkyl halides, sulfates, phosphates, etc.

One of the principal factors in the present alkylation process is the use of a sulfuric acid catalyst whose weight per cent concentration is not greater than approximately 88%. At these concentrations of acid, alkylation proceeds with only a minor amount of sulfonation of the thiophene nucleus, whereas at concentrations of sulfuric acid greater than 88%, thianaphthene undergoes sulfonation and decomposition with little or no alkylation. In general, the reaction is preferably conducted in the presence of sulfuric acid within the range of 70–85% concentration. Although there appears to be no definite lower limit on the concentration of acid which may be used, the practical limit of concentration is about 50%. As the concentrations of acid are decreased the rates of reaction are reduced proportionately. However, with increasing molecular weight of the alkylating agent, decreased concentrations of acid may be used to effect alkylation at approximately the same reaction rate.

An aluminum chloride-sulfuric acid catalyst may also be employed for effecting the alkylation of thianaphthene compounds. The aluminum chloride-sulfuric acid catalyst has a formula of $AlCl_2 \cdot HSO_4$ and is prepared by slowly adding an equimolar amount of 96 per cent $H_2SO_4$ to $AlCl_3$ at 90 to 115° C. The mixture is stirred during and after the addition of $H_2SO_4$ until no more HCl gas is evolved. The yields with the $$AlCl_2 \cdot HSO_4$$

catalyst are generally not as good as with sulfuric acid alone, but it is significant that alkylation of thianaphthene can be effected in the presence of an aluminum chloride-containing catalyst since aluminum chloride usually has a disruptive effect on compounds containing a thiophene nucleus.

Although the preferred sulfuric acid catalyst is one employing water as the diluent, other inert diluents may be used to advantage. The use of diluents other than water, such as an alkyl sulfate or glacial acetic acid, is dependent to a large extent on the type of alkylating agent to be charged and its effect on aqueous sulfuric acid. Thus, a non-aqueous diluent will minimize undesirable side reactions at higher concentrations of acid as well as increase the catalyst life of the acid. Coincident with the use of non-aqueous diluents may be mentioned the substitution of the sulfuric acid in whole or in part by the spent alkylation acid from the sulfuric acid isoparaffin alkylation. This spent acid which ordinarily possesses a concentration of around 88–90% titratable sulfuric acid may be used as makeup acid in a continuous alkylation process, or, as an originally charged catalyst with proper dilution to the desired concentration. When using the spent acid as catalyst, the organic content thereof must be considered as affecting the yield of the desired thianaphthene alkylate.

The temperature and pressure conditions under which the alkylation reactions are to be carried out most effectively will normally vary with each combination of thiophene compound and alkylating agent which may be employed. In general, however, the reaction may be conducted at temperatures in the range of −10 to 100° C. and preferably at 20 to 75° C. while the pressures may range from atmospheric to the vapor pressure of the reactant at the particular temperature employed.

Mol ratios of thianaphthene derivatives to alkylating agent between 1.0 and 5 should be employed. When an olefin is employed as the alkylating agent, it is advisable to employ a mol ratio of thianaphthene to olefin of about 3.0.

The reactants to be employed and the alkylating conditions will determine the optimum ratio of thianaphthene derivative to sulfuric acid. In general, however, the volume ratio of thianaphthene to acid is maintained between 1.0 and 4.0 with optimum results ordinarily being obtained at a volume ratio of about 3.

In order that the invention may be more fully understood, reference is made to the following specific examples which describe preferred methods of practicing the invention. It is to be understood that these examples are presented for illustrative purposes only and are not intended as limitations of the invention.

*Example I*

22.5 cc. of 80 per cent sulfuric acid and 77.8 grams of thianaphthene were charged to a 130 cc. autoclave fitted with a stirrer. To this mixture, 10.7 grams of isobutylene were added slowly over a period of about 36 minutes, during which time the reaction mixture was continually stirred and the temperature of the reaction mixture was maintained at about 38° C. The mol ratio of thianaphthene to olefin was 3.0 and the volume ratio of thianaphthene to acid was 3.0. The reaction mixture was separated into an organic layer and an acid layer and the organic layer was distilled and rectified. Tertiary butyl thianaphthene, a novel compound, was recovered from the reaction mixture in a yield of 100 mol per cent on the basis of the olefin charged and of 67.0 mol per cent on the basis of the thianaphthene consumed.

The 3-tertiary butylthianaphthene obtained by the alkylation of thianaphthene with isobutylene has a boiling point of 132° C. at 10 mm. and has a refractive index of 1.5920. Elementary analysis of the 3-tertiary butylthianaphthene showed values of 75.2 per cent for carbon, 7.2 per cent for hydrogen and 16.7 per cent for sulfur, as contrasted with theoretical values of 75.8 per cent, 7.4 per cent and 16.8 per cent for carbon, hydrogen and sulfur respectively.

*Example II*

18.0 cc. of 80 per cent sulfuric acid and 81.2 grams of thianaphthene were charged to a 130 cc. autoclave fitted with a stirrer. To this mixture, 11.3 grams of isobutylene were added slowly over a period of about 38 minutes, during which time the reaction mixture was continually stirred and the temperature of the reaction mixture was maintained at about 38° C. In the reaction mixture, the mol ratio of thianaphthene to olefin was 3.0 and the volume ratio of thianaphthene to acid was 4.0. The acid layer was separated from the reaction mixture and the organic product was washed and distilled to give a 3-t-butylthianaphthene in a yield of 100 mol per cent on the basis of the olefin charged and 68 mol per cent on the basis of the thianaphthene consumed.

*Example III*

600 cc. of 80 per cent sulfuric acid and 2030 grams of thianaphthene were charged to a 3-liter autoclave fitted with a stirrer. To this mixture, 285 grams of isobutylene were added slowly over a period of 60 minutes during which time the reaction mixture was continually stirred and the temperature of the reaction mixture was maintained at a temperature of about 38° C. In the reaction mixture, the mol ratio of thianaphthene to olefin was 3.0 and the volume ratio of thianaphthene to acid was 3.0. The acid layer was separated from the reaction mixture and the organic product was washed and distilled to give 3-t-butylthianaphthene in a yield of 98 mol per cent on the basis of the olefin charged and 65 mol per cent on the basis of the thianaphthene consumed.

Example IV 16.5 cc. of a mixture of alkane sulfonic acids of $C_1$–$C_4$ hydrocarbons and 53.9 grams of thianaphthene were charged to a 130 cc. autoclave fitted with a stirrer. To this mixture 11.9 grams of isobutylene were added slowly over a period of about 40 minutes during which time the reaction mixture was stirred and the temperature of the reaction mixture was maintained at about 38° C. In the reaction mixture, the mol ratio of thianaphthene to olefin was 1.9 and the volume ratio of thianaphthene to acid was 3.0. The acid layer was separated from the reaction mixture and the organic product was washed and distilled to give 3-t-butylthianaphthene in a yield of 73 mol per cent on the basis of the olefin charged and 52.5 mol per cent on the basis of the thianaphthene consumed.

Example V 8 grams of $AlCl_2 \cdot HSO_4$ and 76.3 grams of thianaphthene were charged to a 130 cc. autoclave fitted with a stirrer. To this mixture 10.7 grams of isobutylene were added slowly over a period of about 36 minutes during which time the reaction mixture was continually stirred and the temperature of the reaction mixture was maintained at about 38° C. In the reaction mixture, the mol ratio of thianaphthene to olefin was 3.0. The mol ratio of thianaphthene to $AlCl_2 \cdot HSO_4$ was 13.9. The acid layer was separated from the reaction mixture and the organic product was washed and distilled to give 3-t-butylthianaphthene in the yield of 38.0 mol per cent on the basis of the olefin charged and 29.4 mol per cent of the basis of the thianaphthene consumed.

Example VI 40 cc. of 80 per cent sulfuric acid and 45 grams of thianaphthene were charged to a 130 cc. autoclave fitted with a stirrer. To this mixture, 7.7 grams of pentene-1 were added slowly over a period of about 24 minutes during which time the reaction mixture was continually stirred. The temperature of the reaction mixture was maintained at about 38° C. In the reaction mixture, the mol ratio of thianaphthene to olefin was 3.1 and the volume ratio of thianaphthene to acid was 1.0. The acid layer was separated from the reaction mixture and the organic product was washed and distilled to give 3(1-methyl-n-butyl) thianaphthene in the yield of 34.8 mol per cent on the basis of the olefin charged and 38.0 mol per cent on the basis of the thianaphthene consumed.

3(1-methyl-n-butyl) thianaphthene obtained by alkylation of thianaphthene with pentene-1, has a boiling point of 144–145° C. at 10 mm. and has a refractive index of 1.5808 at 20° C. Elementary analysis of the 3(1-methyl-n-butyl) thianaphthene showed values of 75.4 per cent for carbon, 7.6 per cent for hydrogen and 16.6 per cent for sulfur as contrasted with calculated theoretical values of 76.5 per cent, 7.8 per cent and 15.7 per cent for carbon, hydrogen and sulfur respectively.

Example VII 40 cc. of 80 per cent sulfuric acid and 45.6 grams of thianaphthene were charged to 130 cc. autoclave fitted with a stirrer. To this mixture, 9.4 grams of hexene-1 were added slowly over a period of about 28 minutes during which time the reaction mixture was continually stirred and the temperature of the reaction mixture was maintained at about 38° C. In the reaction mixture, the mol ratio of thianaphthene to olefin was 3.0 and the volume ratio of thianaphthene to acid was 1.0. The acid layer was separated from the reaction mixture and the organic product was washed and distilled to give 3(1-methyl-n-pentyl) thianaphthene in the yield of 20.0 mol per cent on the basis of the olefin charged and 21.8 mol per cent on the basis of the thianaphthene consumed.

3(1-methyl-n-pentyl) thianaphthene, obtained by the alkylation of thianaphthene with hexene-1, has a boiling point of 128–129° C. at 2 mm. and has a refractive index of 1.5710 at 20° C. Elementary analysis of 3(1-methyl-n-pentyl) thianaphthene showed values of 76.4 per cent for carbon, 8.2 per cent of hydrogen and 15.3 per cent for sulfur, as contrasted with calculated theoretical values of 77.0 per cent, 8.3 per cent and 14.7 per cent for carbon, hydrogen and sulfur respectively.

Example VIII 15 cc. of 80 per cent sulfuric acid and 50.8 grams of thianaphthene were charged to 130 cc. autoclave fitted with a stirrer. To this mixture 32.2 grams of propylene polymer of approximately 18 carbon atoms chain length were added slowly for a period of about 80 minutes during which time the reaction mixture was continually stirred and the temperature of the reaction mixture was maintained at about 75° C. In the reaction mixture the mol ratio of thianaphthene to propylene polymer was 3.0 and the volume ratio of thianaphthene to acid was 3.0. The acid layer was separated from the reaction mixture and the organic product was washed and distilled at reduced pressure to give 3-$C_{18}$ alkyl thianaphthene in a yield of 35.6 mol per cent on the basis of the propylene polymer charged and 32.4 per cent on the basis of the thianaphthene consumed.

The 3-alkyl-substituted thianaphthene, obtained by the alkylation of thianaphthene with a $C_{18}$ propylene polymer, has a boiling point of 178–196° C. at 1 mm. (mostly 184–185° C. at 1 mm.) and has a refractive index of 1.4970 at 20° C.

Elementary analysis of the 3-$C_{18}$ alkyl substituted thianaphthene showed values of 81.4 per cent for carbon, 11.4 per cent for hydrogen and 7.7 per cent for sulfur as contrasted with calculated values of 80.8 per cent, 10.9 per cent and 8.3 per cent for carbon, hydrogen and sulfur respectively.

It is to be understood that temperature conditions other than those specified in the preceding examples may be employed for the alkylation of thianaphthene compounds. Moreover, other alkylating agents such as alcohols, ethers, alkyl chlorides, etc. may be employed as the alkylating agent. Alkylating agents are a well defined class of compounds which may be employed interchangeably in the alkylation reactions.

Obviously many modifications and variations of the invention as hereinabove set forth may be made without departing from the spirit and scope thereof and therefore only such limitations should be imposed as are indicated in the appended claims.

We claim:
1. A process for producing aliphatic-substituted thianaphthene compounds which comprises reacting a thianaphthene compound containing at least one reactive hydrogen atom on the thiophene nucleus with an alkylating agent containing at least 3 carbon atoms under alkylating conditions in the presence of a catalyst containing mainly sulfuric acid and in which catalyst the weight per cent concentration of sulfuric acid is not greater than approximately 88 per cent.

2. A process for producing aliphatic-substituted thianaphthene compounds which comprises reacting a thianaphthene compound containing at least one reactive hydrogen atom on the thiophene nucleus with an unsaturated aliphatic compound containing at least 3 carbon atoms under alkylating conditions in the presence of a catalyst containing sulfuric acid and in which catalyst the weight per cent concentration of sulfuric acid is not greater than about 88 per cent.

3. The process according to claim 2 in which the catalyst has a weight per cent concentration of sulfuric acid between 70 and 85 per cent.

4. A process for producing aliphatic-substituted thianaphthene compounds which comprises reacting thianaphthene with an alkylating agent containing at least 3 carbon atoms under alkylating conditions in the presence of a catalyst containing sulfuric acid and in which catalyst the weight per cent concentration of sulfuric acid is between 50 and 88 per cent.

5. The process according to claim 4 in which the alkylating agent is an olefin.

6. A process for producing aliphatic-substituted thianaphthene compounds which comprises reacting a thianaphthene compound containing at least one reactive hydrogen atom on the thiophene nucleus with an alkylating agent containing at least 3 carbon atoms at temperatures in the range of −10 to 100° C. at pressures ranging from atmospheric to the vapor pressure of the reactants at the temperature of reaction in the presence of 50 to 80 weight per cent sulfuric acid.

7. A process for producing aliphatic-substituted thianaphthene compounds which comprises reacting a thianaphthene compound containing at least one reactive hydrogen atom on the thiophene nucleus with an alkylating agent containing at least 3 carbon atoms under alkylating conditions in the presence of $AlCl_2 \cdot HSO_4$.

ROBERT E. CONARY.
RUSH F. McCLEARY.

References Cited in the file of this patent

UNITED STATES PATENTS

| Number | Name | Date |
|---|---|---|
| 2,396,144 | Anderson | Mar. 5, 1946 |
| 2,478,914 | Greensfelder | Aug. 16, 1949 |
| 2,522,501 | Brooks | Sept. 19, 1950 |

OTHER REFERENCES

Morton: "The Chemistry of Heterocyclic Compounds," pp. 49–50, McGraw-Hill, N. Y., 1946.

Chemical Abstracts, 42, 5448 (1948).